United States Patent [19]
Yang

[11] Patent Number: 5,537,715
[45] Date of Patent: * Jul. 23, 1996

[54] TWIN CASTER OF CRIB AND THE LIKE

[76] Inventor: Su-Hua Yang, 25, Lane 97, Hertzuoh St., Fong-Yuan, Taichung, Taiwan

[ * ] Notice: The portion of the term of this patent subsequent to Oct. 19, 2013, has been disclaimed.

[21] Appl. No.: 335,336

[22] Filed: Nov. 3, 1994

[51] Int. Cl.⁶ .................................................. B60B 33/00
[52] U.S. Cl. ............................................. 16/35 R
[58] Field of Search ............................................. 16/35 R

[56] References Cited

U.S. PATENT DOCUMENTS

| | | | |
|---|---|---|---|
| 3,914,821 | 10/1975 | Screen | 16/35 R |
| 4,455,707 | 6/1984 | Screen | 16/35 R |
| 4,731,899 | 3/1988 | Huang | 16/44 |
| 4,821,369 | 4/1989 | Daniels | 16/35 R |
| 5,165,141 | 11/1992 | Soltani | 16/44 |
| 5,191,675 | 3/1993 | Ishikura | 16/35 R |
| 5,232,071 | 8/1993 | Kawanabe | 16/35 R |
| 5,259,088 | 11/1993 | Yang | 16/47 |
| 5,276,941 | 1/1994 | Chen | 16/44 |
| 5,355,550 | 10/1994 | Yang | 16/35 R |
| 5,368,133 | 11/1994 | Yang | 16/35 R |
| 5,371,921 | 12/1994 | Roe | 16/35 R |
| 5,377,372 | 1/1995 | Rudolf et al. | 16/35 R |

*Primary Examiner*—M. Rachuba
*Assistant Examiner*—Adesh Bhargava
*Attorney, Agent, or Firm*—Browdy and Neimark

[57] ABSTRACT

A crib caster comprises a main body, a horizontal shaft, two wheel members, an urging member, and an elastic element. The main body is provided with first braking portions while the two wheel members are provided with second braking portions. When the crib is occupied by a baby, the main body is caused to descend by the weight of the baby so that the first braking portions of the main body are caused to engage the second braking portions of the two wheel members so as to immobilize the two wheel members.

14 Claims, 6 Drawing Sheets

TWIN CASTER OF CRIB AND THE LIKE

FIELD OF THE INVENTION

The present invention relates generally to a twin caster, and more particularly to the twin caster of a crib, a television stand, and the like.

BACKGROUND OF THE INVENTION

This inventor of the present application filed on Oct. 19, 1993 a U.S. Patent Application with the patent title of PIVOTING CASTER and bearing the patent Ser. No. 08/137,918. The above-mentioned U.S. Patent Application has been examined and is allowed for issuance as a patent. The pivoting caster of the afore-mentioned U.S. patent application is intended for use in an office chair such that the office chain is automatically located as soon as an occupant of the office chair leaves. In other words, such a pivoting caster as described above is intended to enhance the safety feature of the office chair.

According to the investigation done by this inventor of the present invention, the pivoting caster of the above-mentioned U.S. Ser. No. 08/137,918 is in fact not applicable to a crib in view of the fact that the crib is supposed to be freely movably when it is not occupied, and that the crib is supposed to be stationary when it is occupied by a baby for the sake of the safety of the baby. The conventional casters of a crib can be easily caused to slide by the physical activities of a baby occupying the crib, especially when the crib is located on an inclined floor.

SUMMARY OF THE INVENTION

It is therefore the primary objective of the present invention to provide a crib caster comprising mainly a main body, a horizontal shaft, two wheel members, an urging member and an elastic element. The main body is provided with first braking portions while the two wheel members are provided with second braking portions. When the crib is occupied by a baby, the main body is caused to descend by the weight of the baby so that the first braking portions of the main body are caused to engage the second braking portions of the two wheel members so as to immobilize the two wheel members.

The present invention may best be understood through the following description with reference to the accompanying drawings, in which:

DETAILED DESCRIPTION OF THE EMBODIMENTS

Figure 1:
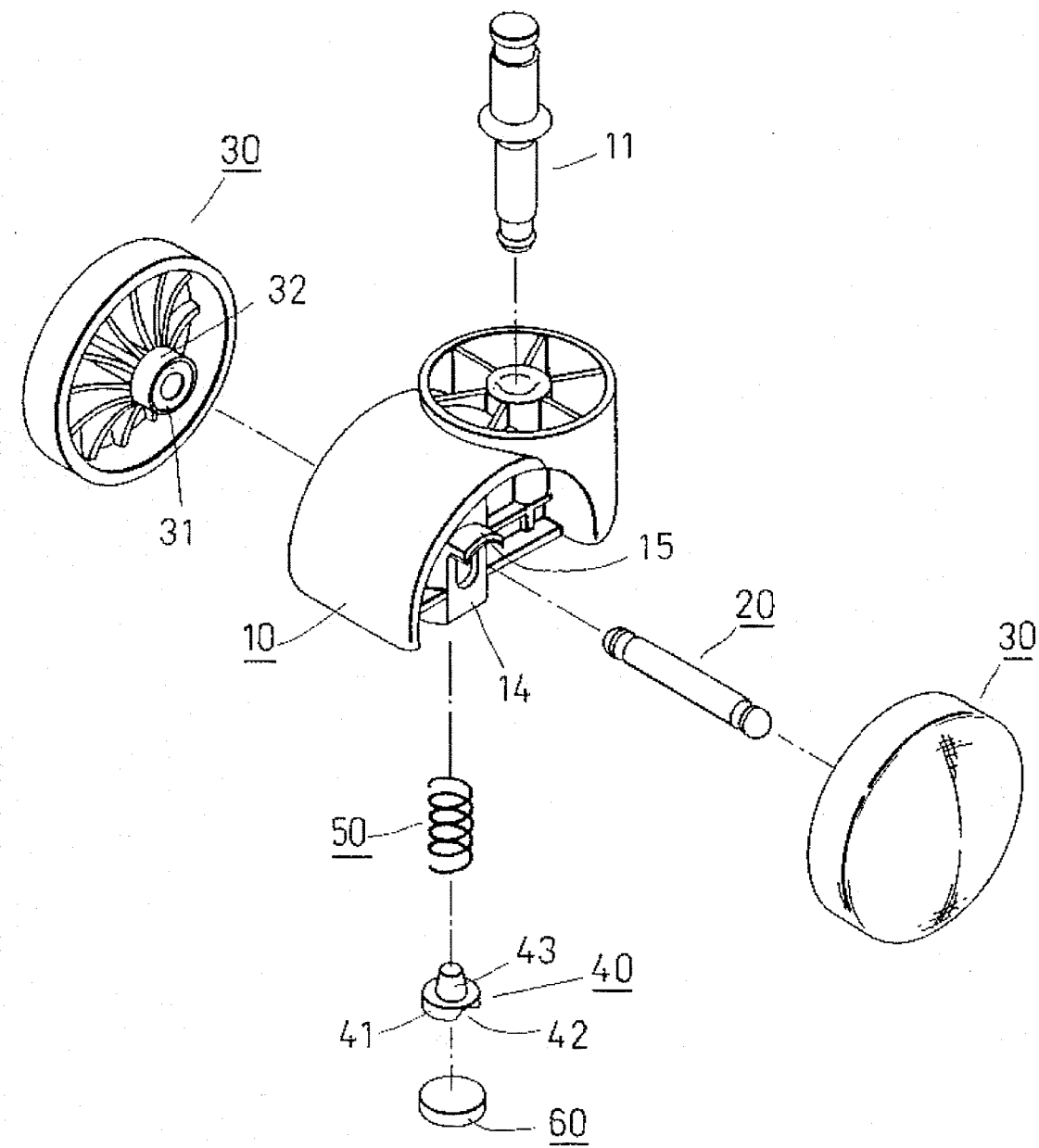
FIG. 1 shows an exploded view of a first preferred embodiment of the present invention.

As shown in all drawings provided herewith, a crib caster embodiment in the present invention comprises a main body 10, a horizontal shaft 20, two wheel members 30, an urging member 40, an elastic member 50, and a plug 60.

Figure 2:
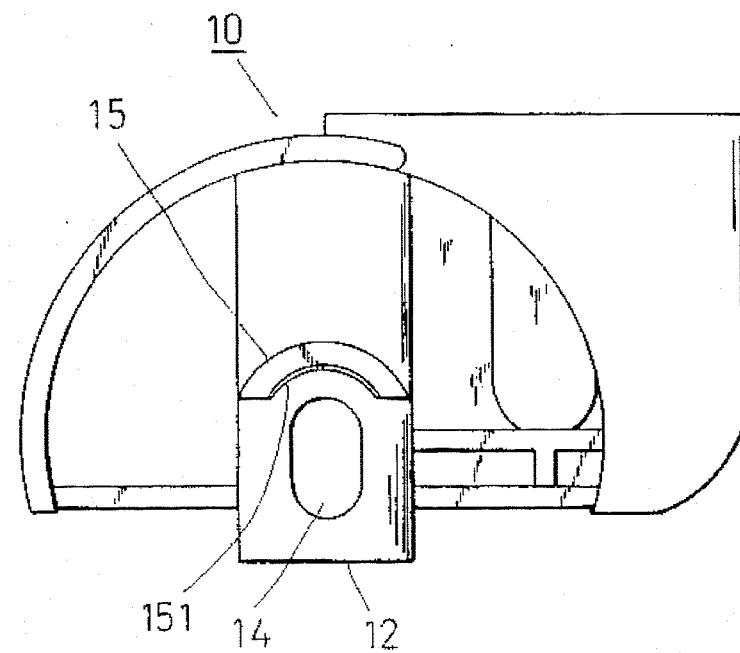
FIG. 2 shows a side plan view of a main body of the first preferred embodiment of the present invention.
Figure 3:
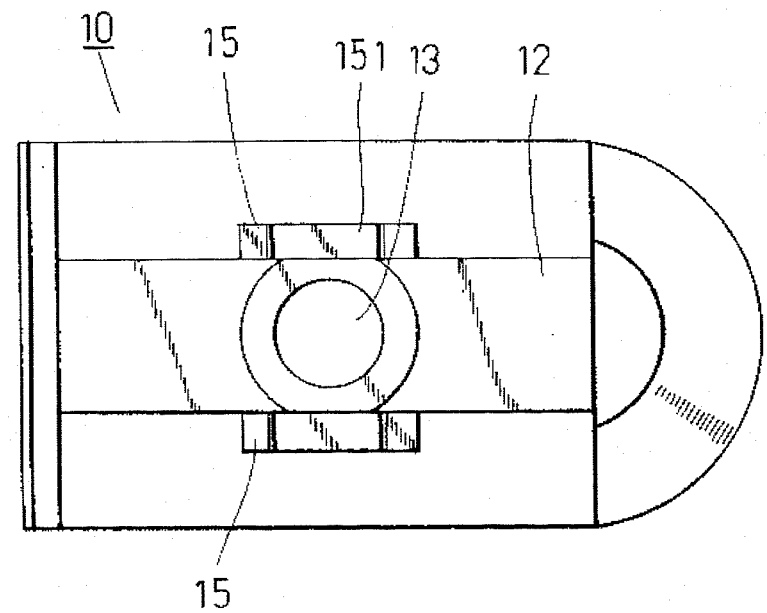
FIG. 3 shows a bottom plan view of the main body of the first preferred embodiment of the present invention.
Figure 4:
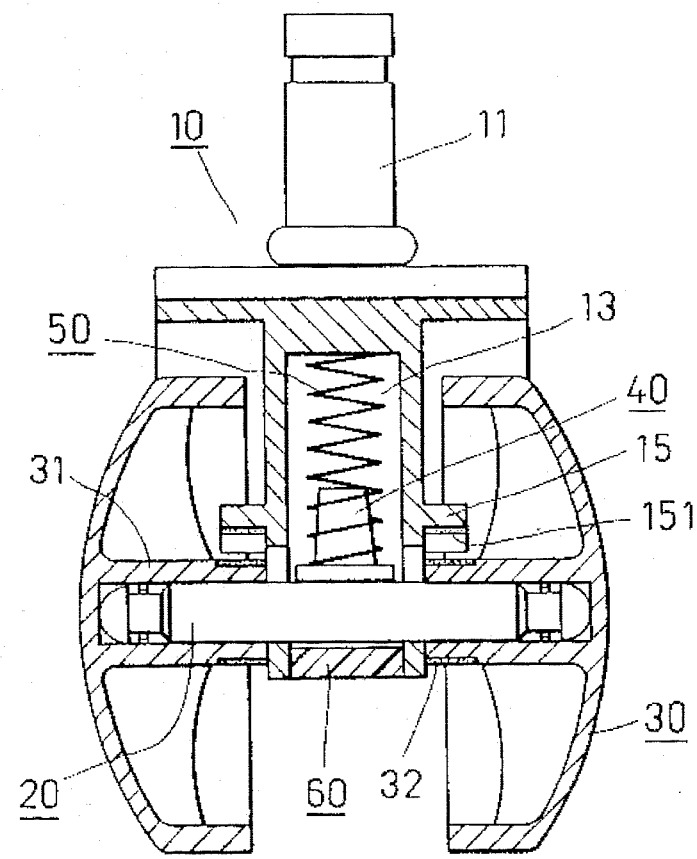
FIG. 4 shows a sectional view taken along the direction of the longitudinal axis of a horizontal shaft of the present invention.
Figure 5:
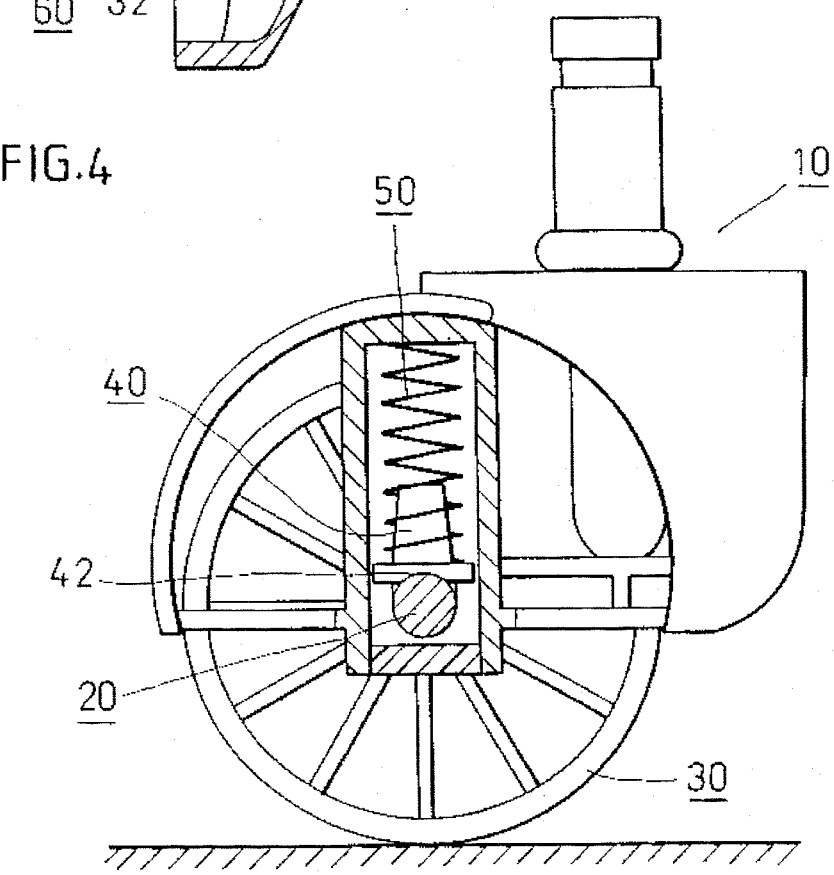
FIG. 5 shows a sectional view taken along the direction of the radius of the horizontal shaft of the present invention.
Figure 6:
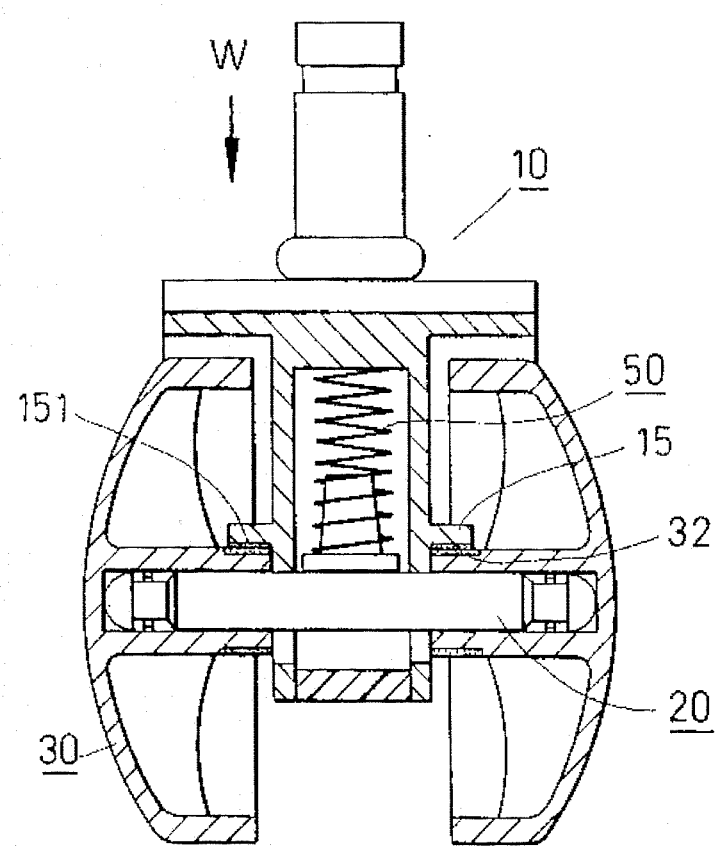
FIG. 6 shows is similar diagrammatically to FIG. 4 and shows schematically the present invention in action upon being exerted by a force.
Figure 7:
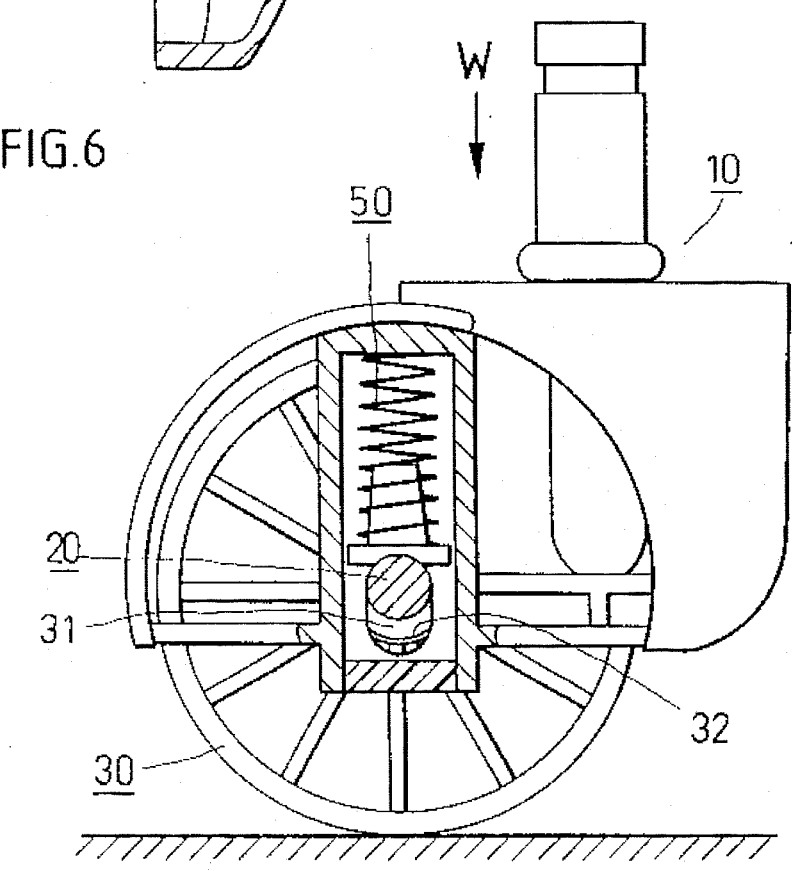
FIG. 7 is similar diagrammatically to FIG. 5 and shows schematically the present invention in action upon being exerted by a force.

The main body 10 is made of a plastic material by injection molding and is provided in one side thereof with an upright shaft 11 pivoted thereto. The upright shaft 11 is intended for use in fastening the main body 10 to each leg, bottom corner, etc. of a crib, a television stand, and the like. The main body 10 is further provided with a bottom portion 12 which is in turn provided centrally with a receiving space of a cylindrical construction and having an opening facing downwards. The bottom portion 12 is further provided centrally in the upper portion thereof with a pivoting hole 14 which has an oblong cross section, as shown in FIG. 2. The main body 10 is still further provided with two arcuate blocks 15 which are located respectively and contiguously at two opposite ends of the pivoting hole 14. The arcuate block 15 has an arcuate underside provided with a first braking portion 151, which is in fact a brake strap that is fastened to the arcuate block 15.

The horizontal shaft 20 has a midsegment which is mounted pivotally in the pivoting hole 14 of the main body 10.

Two wheel members 30 are provided respectively in the inner side thereof with a hub 31, which is fastened pivotally with the end of the horizontal shaft 20 and is provided peripherally with a second braking portion 32 similar in construction to the first braking portion 151 of the main body 10.

The urging member 40 is disposed over the midsegment of the horizontal shaft 20 and is provided with a disk portion 41 having in the underside thereof an arcuate slot 42. The urging member 40 is further provided on the upper surface thereof with a projection 43 extending upwards. The arcuate slot 42 is dimensioned to fit over the upper surface of the midsegment of the horizontal shaft 20.

The elastic element 50 is a compression spring and is received in the receiving space 13 of the main body 10 such that the top end of the elastic element 50 urges the top wall of the receiving space 13, and that the bottom end of the elastic element 50 urges the top surface of the disk portion 41 of the urging member 40. The elastic element 50 is held securely by the projection 43 of the urging member 40 such that one end of the elastic element 50 is fitted over the projection 43. In the meantime, the midsegment of the horizontal shaft 20 is pressed by the elastic force of the elastic element 50 so that the midsegment of the horizontal shaft 20 is located securely in the pivoting hole 14 of the main body 10.

The plug 60 is fitted snugly into the lower end of the receiving space 13 of the main body 10.

The two wheel members 30 can be caused to slide freely when the second braking portions 32 of the two wheel members 30 are disengaged with the first braking portions 151 of the main body 10. As a result, the crib can be pushed around freely. However, when the crib is occupied by a baby, the expanding power of the elastic element 50 is overcome the weight W of the baby occupying the crib, thereby causing the main body 10 to descend to compress the elastic element 50. As the two wheel members 30 and the horizontal shaft 20 remain stationary, the first braking portions 151 of the main body 10 are caused to engage the second braking portions 32 of the two wheel members 30. As a result, the two wheel members 30 are immobilized.

As soon as the crib is relieved of the weight W of the baby occupying the crib, the main body 10 is pushed upwards by the expanding force of the elastic element 50, thereby resulting in the disengagement of the first braking portions 151 of the main body 10 with the second braking portions 32 of the two wheel members 30. As a result, the crib can be pushed around once again.

Figure 8:
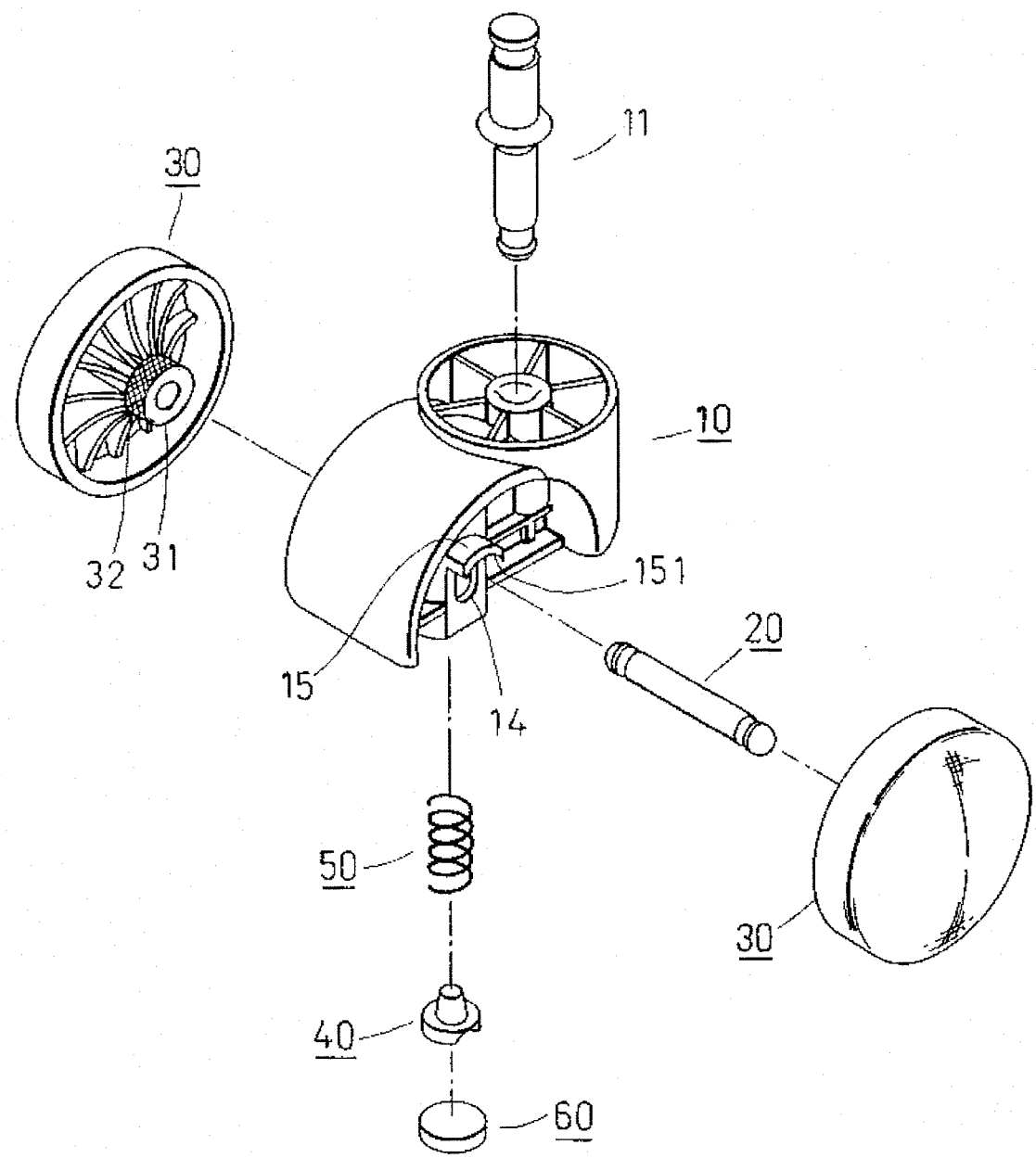
FIG. 8 shows an exploded view of a second preferred embodiment of the present invention.

As shown in FIG. 8, a crib caster of the second preferred embodiment of the present invention is different from the crib caster of the first preferred embodiment of the present invention in that the former is provided with the knurled first braking portions 32. The braking action is effected by the friction force brought about by the contact between the knurls of the first braking portions 151 and the knurls of the second braking portions 32.

Figure 9:
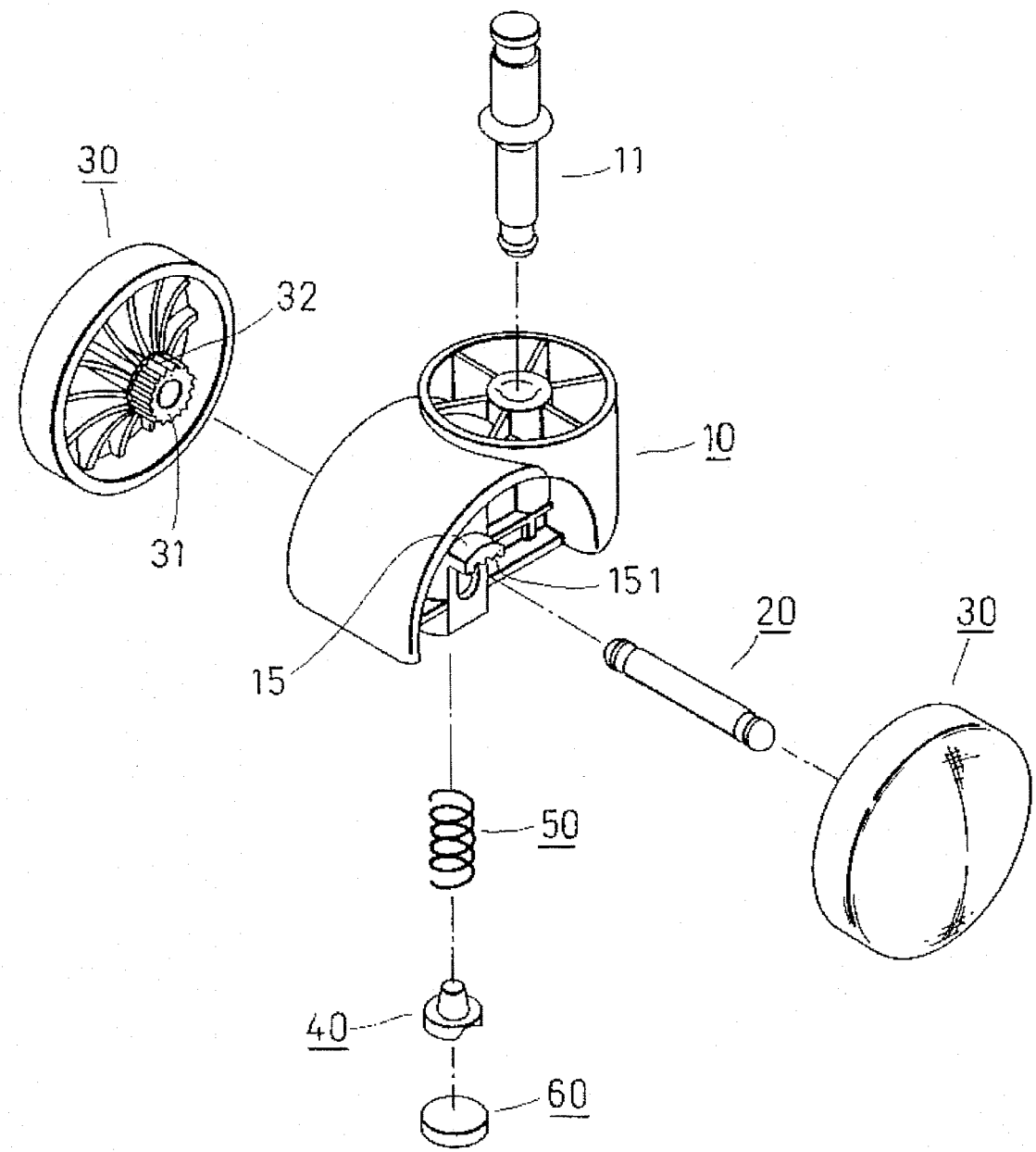
FIG. 9 shows an exploded view of a third preferred embodiment of the present invention.

As shown in FIG. 9, a crib caster of the third preferred embodiment of the present invention is provided with the serrated first braking portions 151 and the serrated second braking portions 32. The braking action is effected by the engagement of the serrated portions of the serrated first braking portions 151 with the serrated portions of the serrated second braking portions 32.

While the invention has been described in connection with what is presently considered to be the most practical and preferred embodiments, it is to be understood that the invention is not to be limited to the disclosed embodiments but on the contrary, is intended to cover various modifications and equivalent arranged included with the spirit and scope of the appended claims which scope is to be accorded the broadest interpretation so as to encompass all such modifications and equivalent structures.

What is claimed is:

1. A twin caster for a piece of furniture comprising:
   a main body provided at one side thereof with an upright shaft for fastening said main body to each leg or bottom corner of the piece of furniture, said main body further provided with a bottom portion which is in turn provided centrally with a receiving space having an opening facing downwards, said bottom portion further provided centrally in an upper portion thereof with a pivoting hole having an oblong cross section;
   a horizontal shaft having a midsegment which is mounted pivotally in said pivoting hole of said main body;
   two wheel members provided respectively in an inner side thereof with a hub which is fastened pivotally with one end of said horizontal shaft;
   an urging member disposed over said midsegment of said horizontal shaft and provided with a disk portion having in an underside thereof an arcuate slot dimensioned to fit over an upper surface of said midsegment of said horizontal shaft, said urging member further provided on an upper surface thereof with a projection extending upwards; and
   an elastic element received in said receiving space of said main body such that a top end of said elastic element urges a top wall of said receiving space, and that a bottom end of said elastic element urges a top surface of said disk portion of said urging member, said elastic element having one end that is fitted over said projection of said urging member such that said elastic element forces said midsegment of said horizontal shaft to locate securely in said pivoting hole of said main body;
   wherein said main body is provided with two arcuate blocks which are located respectively and contiguously at two opposite ends of said pivoting hole, said two arcuate blocks having respectively an arcuate underside provided with a first braking portion; and
   wherein said hub of each of said two wheel members is provided peripherally with a second braking portion engageable with said first braking portion of said main body to bring about a braking action capable of immobilizing said wheel members when said main body is caused by an external force to descend.

2. A twin caster of claim 1 wherein said first braking portion and said second braking portion are made of a brake strap.

3. A twin caster of claim 1 wherein said first braking portion and said second braking portion are provided thereon respectively with a knurled portion.

4. A twin caster of claim 1 wherein said first braking portion and said second braking portion are provided thereon respectively with a serrated portion.

5. A pivoting castor comprising:
   a main body provided on one side thereof with a shaft post pivoted thereto and intended to permit said main body to be mounted pivotally under an outer end of each branch of a claw-shaped bottom seat of a chair, said main body having a bottom provided centrally and upwardly with a receiving space of cylindrical construction and having an opening facing downwards, said bottom of said main body further provided in an upper portion of a center thereof with a pivoting hole having a cross section of an upright oblong shape, said pivoting hole provided respectively over both sides thereof with a recessed arcuate collar block provided in a circumferential surface of a bottom thereof with a first contact portion;
   a cross shaft having a midsection pivoted in said pivoting hole of said main body;
   two wheeled members pivoted respectively to both ends of said cross shaft and provided respectively in an inner side thereof with a shaft tube portion provided in a circumferential surface thereof with a second contact portion;
   a braking member mounted over said midsection of said cross shaft and provided with a disk portion having a bottom provided with an arcuate slot and having a top provided with a post extending upwards therefrom, said arcuate slot being attached to a top surface of said midsection of said cross shaft; and
   an elastic element disposed in said receiving space of said main body such that a tope end of said elastic element urges a top wall of said receiving space, and that a bottom end of said elastic element urges said disk portion of said braking member, and further that said post is fitted into a lower segment of said elastic element, and still further that said elastic element presses downwards said cross shaft so as to cause said midsection of said cross shaft to move downwards to each a lower segment of said pivoting hole, thereby causing said second contact portion of said two wheeled members to disengage said first contact portion of said main body so as to allow the mobility of said wheeled members.

6. The pivoting castor of claim 5, wherein said first contact portion is provided with a plurality of slots; and wherein said second contact portion is provided with a plurality of ridges arranged at an interval in a circumferential surface of said shaft tube portion.

7. The pivoting castor of claim 6 further comprising a plug cover fitted within said opening of said receiving space.

8. The pivoting castor of claim 5, wherein said first contact portion is provided with a plurality of ridges; and wherein said second contact portion is provided with a plurality of slots arranged at an interval in a circumferential surface of said shaft tube portion.

9. The pivoting castor of claim 8 further comprising a plug cover fitted within said opening of said receiving space.

10. The pivoting castor of claim 5 wherein said second contact portion is embossed.

11. The pivoting castor of claim 10 further comprising a plug cover fitted within said opening of said receiving space.

12. The pivoting castor of claim 5 wherein said first contact portion and said second contact portion are brake shoes.

13. The pivoting castor of claim 12 further comprising a plug cover fitted within said opening of said receiving space.

14. The pivoting castor of claim 5 further comprising a plug cover fitted within said opening of said receiving space.

* * * * *